United States Patent Office 3,641,221
Patented Feb. 8, 1972

3,641,221
O-ALKYL-O-ARYL-THIOLPHOSPHORIC ACID ESTERS
Gerhard Schrader, Wuppertal-Cronenberg, Ingeborg Hammann, Cologne, and Wilhelm Stendel, Wuppertal-Vohwinkel, Germany, assignors to Farbenfabriken Bayer Aktiengesellschaft, Leverkusen, Germany
No Drawing. Filed Apr. 9, 1969, Ser. No. 814,809
Claims priority, application Germany, May 9, 1968,
P 17 68 399.7
Int. Cl. A01n 9/36; C07f 9/16, 9/18
U.S. Cl. 260—949
10 Claims

ABSTRACT OF THE DISCLOSURE

O-alkyl-O-aryl-thiolphosphoric acid esters, of the formula

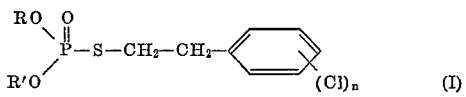
(I)

in which
R is lower alkyl of 1–4 carbon atoms;
R' is phenyl, chloro-substituted phenyl, alkylmercapto-phenyl having 1–4 carbon atoms in the alkyl mercapto moiety, (alkyl)-(alkylmercapto)-phenyl having 1–4 carbon atoms in the alkyl moiety and 1–4 carbon atoms in the alkylmercapto moiety, alkoxy-phenyl having 1–4 carbon atoms in the alkoxy moiety, (alkyl)-(chloro)-phenyl having 1–4 carbon atoms in the alkyl moiety, or naphthyl; and
n is a whole number from 0 to 2,
which posses arthropodicidal, especially acaricidal and insecticidal, properties and which may be produced by conventional methods.

The present invention relates to and has for its objects the provision for particular new O - alkyl - O - aryl-thiolphosphoric acid esters, i.e. O-alkyl-O-[phenyl, chloro-substituted phenyl, alkylmercapto-phenyl, (alkyl)-(alkyl-mercapto)-phenyl, alkoxy-phenyl, (alkyl)-(chloro)-phenyl, and naphthyl]-S-[β-(phenyl and chloro-substituted phenyl)-ethyl]-thiolphosphoric acid esters, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

Optionally chlorinated S-benzyl esters of O,O-dialkyl-thiolphosphoric acids are known from German Patents 949,231 and 1,018,053, and U.S. Patent 3,156,718. According to the particulars given in said patents, these products, e.g. O,O-diethyl-S-benzyl-thiolphosphoric acid ester (A), possess good insecticidal and acaricidal effectiveness with, at the same time, low toxicity to warm-blooded animals; they are therefore usable as pesticides in plant protection and in the hygiene field.

Furthermore, German published patent 1,252,961 describes fungicidal mixtures for use in agriculture which contain, as active component, symmetrical O,O-dialkyl-S-(ω-phenyl-alkyl)-thiolphosphoric acid esters with 2 to 10 carbon atoms in the S-alkyl radical, e.g. O,O-diethyl-S-(β-phenyl-ethyl)-thiolphosphoric acid ester (B).

It has now been found, in accordance with the present invention, that the particular new O-alkyl-O-aryl-thiolphosphoric acid esters of the formula

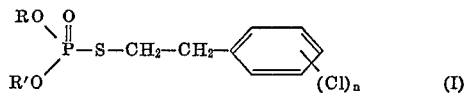
(I)

in which
R is lower alkyl of 1–4 carbon atoms;
R' is phenyl, chloro-substituted phenyl, alkylmercapto-phenyl having 1–4 carbon atoms in the alkyl mercapto moiety, (alkyl)-(alkylmercapto)-phenyl having 1–4 carbon atoms in the alkyl moiety and 1–4 carbon atoms in the alkylmercapto moiety, alkoxy-phenyl having 1–4 carbon atoms in the alkoxy moiety, (alkyl)-(chloro)-phenyl having 1–4 carbon atoms in the alkyl moiety, or naphthyl; and
n is a whole number from 0 to 2;

exhibit strong arthropodicial, especially insecticidal and acaricidal, properties.

It has been furthermore found, in accordance with the present invention, that a process may be provided for the production of the compounds of Formula I above, which comprises hydrolyzing an O-alkyl-O-aryl-thionophosphoric acid ester halide of the general formula

(II)

in which R and R' are the same as defined above, and Hal is a halogen atom such as chloro, bromo, fluoro or iodo, especially chloro, and then reacting the hydrolysis product thereby formed, expediently without previous isolation, with a β-phenyl-ethyl halide of the general formula

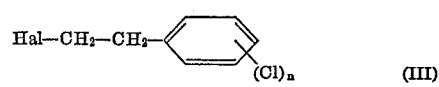
(III)

in which Hal and n are the same as defined above.

Advantageously, the particular new compounds of Formula I above are distinguished by outstanding insecticidal and acaricidal properties; they possess both a very good activity against eating and sucking insects and an excellent effectiveness against spider mites and ticks; furthermore, some of them possess a good fungitoxic side-effect. Surprisingly, the instant compounds, compared to the previously known active compounds of analogous constitution and the same direction of activity, such as compounds (A) and (B) mentioned above, possess substantially better effectiveness, with considerably lower toxicity to warm-blooded animals and concomitantly low phytotoxicity. The new compounds of the present invention therefore represent a genuine enrichment of the art.

The course of the production process according to the present invention is illustrated by the following reaction scheme:

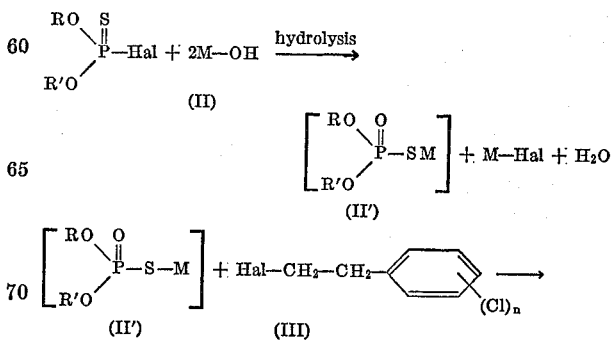

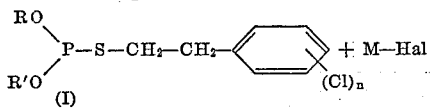

In the above equations, R, R', Hal and $n$ are the same as defined above, and M is a monovalent metal equivalent, e.g. alkali metal such as potassium, or the ammonium group.

Advantageously, in accordance with the present invention, in the various formulae herein:

R represents straight and branched chain lower alkyl of 1–4 carbon atoms such as methyl, ethyl, n- and iso-propyl, n-, iso-, sec.- and tert.-butyl, and the like, especially $C_{1-3}$ or $C_{1-2}$ alkyl, and more especially ethyl;

R' represents:

Phenyl;

Chloro-substituted phenyl such as mono-, di- and tri-chloro-phenyl, including 2-, 3- and 4- mono-; 2,3-, 2,4- 2,5-, 2,6- 3,4- and 3,5- di-; and 2,3,4-, 2,3,5-, 2,3,6-, 2,4,5-, 2,4,6- and 3,45- tri- -chloro-phenyl especially chloro-phenyl of 1–3 chloro substituents;

Alkylmercapto-phenyl having 1–4 carbon atoms in the alkylmercapto moiety such as methyl to tert.-butyl inclusive as defined above, and the like, -mercapto-phenyl, including 2-, 3- and 4-$C_{1-4}$ or $C_{1-3}$ or $C_{1-2}$ alkylmercapto-phenyl, especially methylmercapto-phenyl;

(Alkyl)-(alkylmercapto)-phenyl having 1–4 carbon atoms in the alkyl moiety and 1–4 carbon atoms in the alkylmercapto moiety such as (methyl to tert.-butyl inclusive as defined above, and the like)-(methyl to tert.-butyl inclusive as defined above, and the like, -mercapto)-phenyl, including 2,3-, 2,4-, 2,5-, 2,6-, 3,4- and 3,5-, i.e. mixed, ($C_{1-4}$ or $C_{1-3}$ or $C_{1-2}$ alkyl, especially methyl)-($C_{1-4}$ or $C_{1-3}$ or $C_{1-2}$ alkylmercapto, especially methylmercapto)-phenyl;

Alkoxy-phenyl having 1–4 carbon atoms in the alkoxy moiety such as methoxy, ethoxy, n- and iso- propoxy, n-, iso-, sec.- and tert.-butoxy, and the like, -phenyl, including 2-, 3- and 4- $C_{1-4}$ or $C_{1-3}$ or $C_{1-2}$ alkoxy-phenyl, especially methoxy-phenyl;

(Alkyl)-(chloro)-phenyl having 1–4 carbon atoms in the alkyl moiety such as (methyl to tert.-butyl inclusive as defined above, and the like)-(chloro)-phenyl, including 2,3-, 2,4-, 2,5-, 2,6-, 3,4- and 3,5-, i.e. mixed, ($C_{1-4}$ or $C_{1-3}$ or $C_{1-2}$ alkyl, especially methyl)-(chloro)-phenyl; or naphthyl;

$n$ represents a whole number from 0 to 2, i.e., 0, 1 or 2, especially 0 or 1,

Such that, when $n=1$, $(Cl)_n$ is 2-, 3- or 4- chloro, and, when $n=2$, $(Cl)_n$ is 2,3-, 2,4-, 2,5-, 2,6-, 3,4- or 3,5-dichloro, i.e. with respect to the corresponding phenyl nucleus.

Preferably, R is $C_{1-2}$ alkyl, especially ethyl; R' is phenyl; or mono to trichloro-substituted phenyl; or $C_{1-2}$ alkylmercapto-phenyl, especially methylmercapto-phenyl; or ($C_{1-2}$ alkyl)-($C_{1-2}$ alkylmercapto)-phenyl, especially (methyl)-(methylmercapto)-phenyl; or $C_{1-2}$ alkoxy-phenyl; or ($C_{1-4}$ alkyl)-(chloro)-phenyl; or naphthyl; and $n$ is 0–1.

Some of the O-alkyl-O-aryl-thionophosphoric acid ester halides of Formula II above required as starting materials for the production process according to the present invention are described in the literature. These starting compounds can be prepared, even on an industrial scale, according to known methods by reaction of the appropriate O-alkyl-thionophosphoric monoester dihalides with suitable phenols in the presence of acid-binding agents. The reaction takes place preferably in aqueous-alkaline solution at room temperature or slightly elevated temperature.

Suitable starting materials include the following O-alkyl-O-aryl-thionophosphoric acid ester halides, for example:

O-ethyl-O-phenyl-,
O-ethyl-O-(2-chloro-phenyl)-,
O-ethyl-O-(3-chloro-phenyl)-,
O-ethyl-O-(4-chloro-phenyl)-,
O-ethyl-O-(2,4- and 2,5-dichloro-phenyl)-,
O-ethyl-O-(2,4,5- and 2,4,6-trichloro-phenyl)-,
O-ethyl-O-(2-chloro-4-methyl-phenyl)-,
O-ethyl-O-(3-chloro-4-methyl-phenyl)-,
O-ethyl-O-(3-methyl-4-chloro-phenyl)-,
O-ethyl-O-(2-methyl-4-chloro-phenyl)-,
O-ethyl-O-(2-chloro-4-tert.-butyl-phenyl)-,
O-ethyl-O-(4-methoxy-phenyl)-,
O-ethyl-O-(3-methoxy-phenyl)-,
O-ethyl-O-(2-methoxy-phenyl)-,
O-ethyl-O-(4-methylmercapto-phenyl)-,
O-ethyl-O-(3-methyl-4-methylmercapto-phenyl)-,
O-ethyl-O-(2-methyl-4-methylmercapto-phenyl)-, and
O-ethyl-O-naphthylthionophosphoric acid ester chlorides and bromides and the corresponding O-methyl, -n-propyl and -isopropyl compounds.

The 2-phenyl-ethyl halides of Formula III above which may be used as second reaction component are also known from the literature.

As examples of such starting 2-phenyl-ethyl halides which may be reacted according to the instant process, there are mentioned in particular:

β-phenyl-ethyl chloride,
β-(2-chloro-phenyl)-ethyl chloride,
β-(3-chloro-phenyl-)-ethyl chloride,
β-(4-chloro-phenyl-)-ethyl chloride, and
β-(2,4-, 3,4- and 2,5-dichloro-phenyl)-ethyl chlorides and the corresponding bromides.

Both the first and the second step of the reaction according to the process are carried out preferably in the presence of a solvent (the term solvent as used herein including mere diluents). While the hydrolysis reaction preferably proceeds in aqueous or aqueous-alcoholic solution, the reaction with the β-phenyl-ethyl halides can be carried out in practically all organic solvents or mixtures thereof. These include aliphatic or aromatic (possibly chlorinated) hydrocarbons such as benzine, methylene chloride, benzene, toluene, chlorobenzene, xylene; ethers, for example diethyl or di-n-butyl ether, dioxan or tetrahydrofuran; and low-boiling point aliphatic alcohols, ketones and nitriles, for example methanol, ethanol, isopropanol, butanol, acetone, methylethyl ketone, methylisopropyl ketone, methylisobutyl ketone and acetonitrile and propionitrile; and the like.

Hydrolyzing agents suitable for the instant process are chiefly alkalies, preferably aqueous or aqueous-alcoholic solutions of sodium hydroxide or of potassium hydroxide.

The process can be carried out within a fairly wide temperature range. In general, the work is carried out at substantially between about 20–100° C. (or the boiling point of the mixture), preferably at between about 20–80° C.

As can be seen from the foregoing reaction scheme, about 2 mols of alkali and about 1 mol of β-phenyl-ethyl halide are required per mole of O-alkyl-O-aryl-thiophosphoric acid ester halide. It has proved expedient to add the solution of alkali to the aqueous or aqueous-alcoholic solution of the ester chloride, adding the β-phenyl-ethyl halide undiluted (after completion of the hydrolysis and possibly without isolation of the intermediate product formed) to the reaction mixture with stirring, and then continuing heating to the temperatures stated for a longer period (1 to 3 hours) in order to complete the reaction. With this method of working, the instant products are obtained with outstanding yields and in excellent purity.

The working up of the reaction mixture takes place in the usual manner, for example by taking it up in a solvent not miscible with water or water/alcohol, separating the phases, washing and drying of the organic layer, evaporation of the solvent and, if desired, fractional distillation of the residue.

phenyl, alkylmercapto-phenyl having 1-4 carbon atoms in the alkylmercapto moiety, (alkyl)-(alkylmercapto)-phenyl having 1-4 carbon atoms in the alkyl moiety and 1-4 carbon atoms in the alkylmercapto moiety, alkoxy-phenyl having 1-4 carbon atoms in the alkoxy moiety, (alkyl)-(chloro)-penyl having 1-4 carbon atoms in the alkyl moiety, and naphthyl, and $n$ is a whole number from 0-2.

2. Compound according to claim 1 wherein R is $C_{1-2}$ alkyl, R' is selected from the group consisting of phenyl, mono to trichloro-substituted phenyl, $C_{1-2}$ alkylmercapto-phenyl, ($C_{1-2}$ alkyl)-($C_{1-2}$ alkylmercapto)-phenyl, $C_{1-2}$ alkoxy-phenyl, ($C_{1-4}$ alkyl)-chloro)-phenyl, and naphthyl, and $n$ is 0-1.

3. Compound according to claim 1 wherein such compound is O-ethyl-O-phenyl-S-($\beta$-phenyl-ethyl)-thiolphosphoric acid ester of the formula

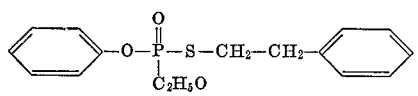

4. Compound according to claim 1 wherein such compound is O-ethyl-O-(4-chloro-phenyl)-S-($\beta$-phenyl-ethyl)-thiolphosphoric acid ester of the formula

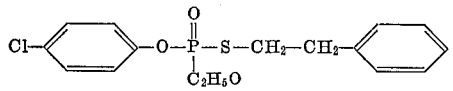

5. Compound according to claim 1 wherein such compound is O-ethyl-O-phenyl-S-[$\beta$-(4-chloro-phenyl)-ethyl]-thiolphosphoric acid ester of the formula

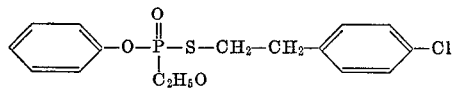

6. Compound according to claim 1 wherein such compound is O - ethyl - O-(3-methoxy-phenyl)-S-($\beta$-phenyl-ethyl)-thiolphosphoric acid ester of the formula

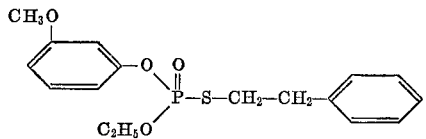

7. Compound according to claim 1 wherein such compound is O-ethyl-O-(3-methyl-4-methylmercapto-phenyl)-S-($\beta$-phenyl - ethyl) - thiolphosphoric acid ester of the formula

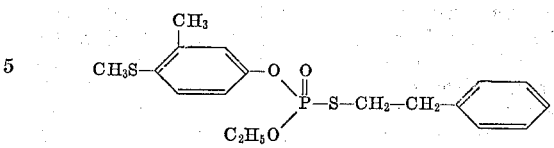

8. Compound according to claim 1 wherein such compound is O - ethyl - O-(2-methyl-4-chloro-phenyl)-S-($\beta$-phenyl-ethyl)-thiolphosphoric acid ester of the formula

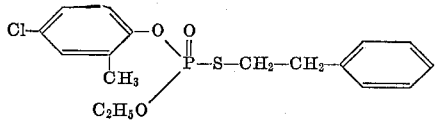

9. Compound according to claim 1 wherein such compound is O - ethyl - O-($\beta$-naphthyl)-S-($\beta'$-phenyl-ethyl)-thiolphosphoric acid ester of the formula

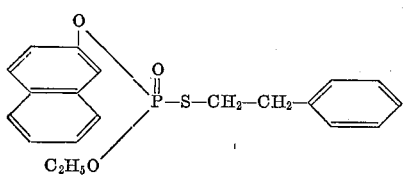

10. Compound according to claim 1 wherein such compound O - ethyl - O - (4-methylmercapto-phenyl)-S-[$\beta$-(4'-chloro-phenyl)-ethyl]-thiolphosphoric acid ester of the formula

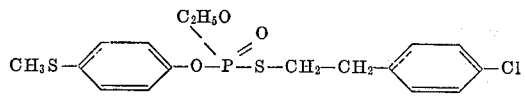

References Cited
UNITED STATES PATENTS 2,938,919   5/1960   Lorenz et al. -------- 260—949

CHARLES B. PARKER, Primary Examiner

R. L. RAYMOND, Assistant Examiner

U.S. Cl. X.R.

260—951, 963, 964; 424—216, 217, 225 of 200 ml. of water and 200 ml. ethanol. To this solution there are added at 20° C., with stirring, 60 g. potassium hydroxide in 120 ml. of water. The temperature of the mixture rises to 70° C. In order to complete the hydrolysis, the reaction mixture is then boiled for 4 hours and 110 g. β-(4-chloro-phenyl)-ethyl bromide are then added to it at 80° C., with further stirring. The mixture is heated at the temperature stated for a further 2 hours and then cooled. Finally, the mixture is taken up in 400 ml. methylene chloride, the methylene chloride solution is washed with water until there is a neutral reaction, the organic phase is separated and dried, the solvent is evaporated and the residue is slightly distilled at 100° C. at a pressure of 0.01 mm. Hg.

There are obtained in this manner 95 g. (41% of the theory) of O-ethyl-O-(4-chloro-phenyl)-S-[β-(4'-chloro-phenyl)-ethyl]-thiol-phosphoric acid ester in the form of a non-distillable oil with a refractive index of $n_D^{22}$ =1.5690.

Calculated for $C_{16}H_{17}Cl_2O_3PS$ (molecular weight 391) (percent): P, 7.9; S, 8.2; Cl, 18.2. Found (percent): P, 8.2; S, 7.8; Cl, 17.9.

EXAMPLE 14

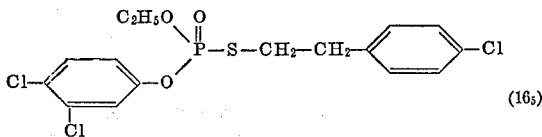

48 g. potassium hydroxide dissolved in 100 ml. of water are added at 20° C., with stirring, to a soltuion of 110 g. (0.4 mol) O-ethyl-O-(3-chloro-phenyl)-thionophosphoric acid ester chloride in 200 ml. of water and 200 ml. of ethanol, the temperature of the mixture rising to 70° C. After completion of the addition, the mixture is boiled for 4 hours. 88 g. β-(4-chloro-phenyl)-ethyl bromide are subsequently added to the reaction mixture at 80° C., and the mixture is heated at this temperature for 2 hours and, finally, it is cooled. After cooling, the mixture is taken up in methylene chloride.

The methylene chloride solution is washed until it gives a neutral reaction, dried, and the solvent is evaporated. The residue is slightly distilled at 90° C./0.01 mm. Hg. The O-ethyl-O-(3 - chloro-phenyl)-S-[β-(4' - chloro-phenyl)-ethyl]-thiolphosphoric acid ester is obtained as a water-insoluble oil which can be distilled in small amounts at 140° C. under a pressure of 0.01 mm. Hg and possesses the refractive index $n_D^{22}$=1.5708.

The yield is 80 g. (51% of the theory).

Calculated for $C_{16}H_{17}Cl_2O_3PS$ (molecular weight 391) (percent): P, 7.9; S, 8.2; Cl, 18.2. Found (percent): P, 7.9; S, 8.2; Cl, 17.6.

EXAMPLE 15

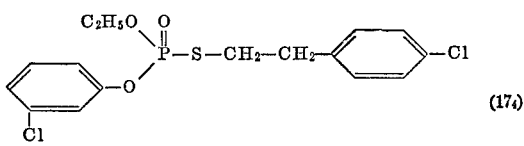

In an analogous manner to that described in Example 14 there are obtained, by hydrolysis of O-ethyl-O-(2-chlorophenyl)-thionophosphoric acid ester chloride and subsequent reaction with β-(4-chloro-phenyl)-ethyl bromide, 75 g. (48% of the theory) of O-ethyl-O-(2-chloro-phenyl)-S-[β-(4' - chlorophenyl)-ethyl]-thiolphosphoric acid ester as non-distillable, water-insoluble oil with the refractive index $n_D^{22}$=1.5667, but which can be slightly distilled at 80° C./0.01 mm. Hg.

Calculated for $C_{16}H_{17}Cl_2O_3PS$ (molecular weight 391) (percent): P, 7.9; S, 8.2; Cl, 18.2. Found (percent): P, 8.0; S, 7.6; Cl, 18.1.

EXAMPLE 16

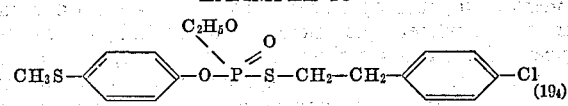

By reaction of 114 g. (0.4 mol) O-ethyl-O-(4-methyl-mercapto-phenyl)-thionophosphoric acid ester chloride with aqueous-alcoholic solution of potassium hydroxide at 20 to 60° C. and subsequent reaction with 88 g. β-(4-chloro-phenyl)-ethyl bromide under the conditions stated in Example 14, and slight distillation of the reaction product at 80° C./0.01 mm. Hg, the O-ethyl-O-(4-methylmercapto-phenyl)-S-[β-(4'-chloro-phenyl)-ethyl]-thiolphosphoric acid ester is obtained in the form of an oil which is water-insoluble and cannot be distilled, and has the refractive index $n_D^{22}$=1.5942.

The yield is 85 g. (53% of the theory).

Calculated for $C_{17}H_{20}ClO_3PS_2$ (molecular weight 402.5) (percent): P, 7.7; S, 15.9; Cl, 8.8. Found (percent): P, 7.6; S, 14.9; Cl, 9.5.

EXAMPLE 17

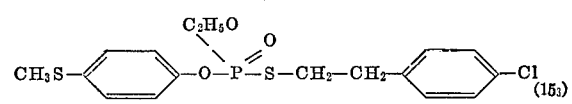

142 g. (0.5 mol) O-ethyl-O-(4 - methylmercapto-phenyl)-thionophosphoric acid ester chloride are hydrolyzed at 20 to 70° C. in the manner described in the preceding Examples with 60 g. potassium hydroxide dissolved in 120 ml. of water and subsequently reacted with 93 g. β-phenyl-ethyl bromide.

After slight distillation of the reaction product at 70° C. under a pressure of 0.01 mm. Hg, 105 g. (57% of the theory) of the O-ethyl-O-(4-methylmercapto-phenyl)-S-(β-phenyl-ethyl)-thiolphosphoric acid ester are obtained as a water-insoluble oil which can be distilled in small amounts, the distillate of which boils at 134° C./0.01 mm. Hg and possesses the refractive index $n_D^{22}$=1.5890.

Calculated for $C_{17}H_{21}O_3PS_2$ (molecular weight 368) (percent): P, 8.4; S, 17.4. Found (percent): P, 8.3; S, 17.4.

It will be realized that all of the foregoing compounds contemplated by the present invention possess the desired selective pesticidal, especially arthropodicidal, i.e. insecticidal or acaricidal, properties for combating insects and acarids, and that such compounds have not only a very slight toxicity toward warm-blooded creatures, but also a concomitantly low phytotoxicity.

As may be used herein, the terms "arthropod," "arthropodicidal" and "arthropodicide" contemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. O-alkyl-O - aryl - thiolphosphoric acid ester of the formula

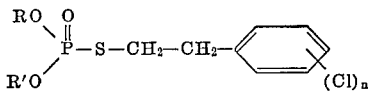

in which R is alkyl of 1–4 carbon atoms, R' is selected from the group consisting of phenyl, chloro-substituted Yield: 56% of the theory of O-ethyl-O-(2,4,5-trichlorophenyl)-S-(β-phenyl-ethyl)-thiolphosphoric acid ester.

Calculated for C₁₆H₁₆Cl₃O₃PS (molecular weight 425.5) (percent): P, 7.3; S, 7.5. Found (percent): P, 7.5; S, 7.7.

(a₅)
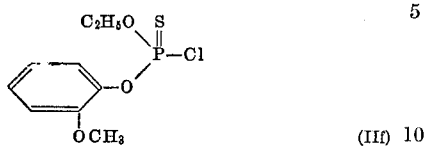
(III)

Yield: 72% of the theory of O-ethyl-O-(2-methoxy-phenyl)-thionophosphoric acid ester chloride, B.P. 95° C./0.01 mm. Hg.

Calculated for C₉H₁₂ClO₃PS (molecular weight 266.5) (percent): P, 11.6; S, 12.0; Cl, 13.3. Found (percent): P, 11.6; S, 12.0; Cl, 13.5.

(b₅)
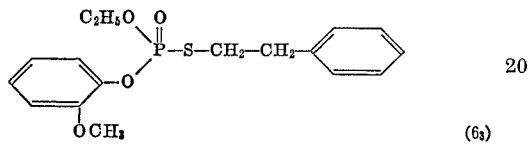
(6₃)

Yield: 60% of the theory of O-ethyl-O-(2-methoxy-phenyl)-S-(β-phenyl-ethyl)-thiolphosphoric acid ester.

Calculated for C₁₇H₂₁O₄PS (molecular weight 352) (percent): P, 8.8; S, 9.1. Found (percent): P, 8.4; S, 9.6.

(a₆)
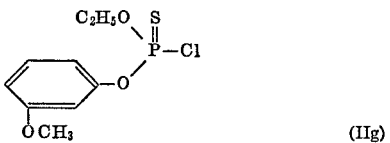
(IIg)

Yield: 66% of the theory, O-ethyl-O-(3-methoxy-phenyl)-thionophosphoric acid ester chloride, B.P. 94° C./0.01 mm. Hg.

Calculated for C₉H₁₂ClO₃PS (molecular weight 266.5) (percent): P, 11.6; S, 12.0; Cl, 13.3. Found (percent): P, 11.3; S, 12.1; Cl, 13.6.

(b₆)
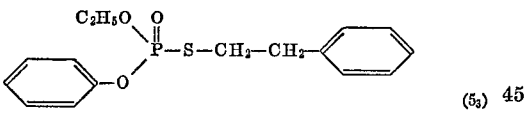
(5₃)

Yield: 53% of the theory of O-ethyl-O-(3-methoxy-phenyl)-S-(β-phenyl-ethyl)-thiolphosphoric acid ester.

Calculated for C₁₇H₂₁O₄PS (molecular weight 352) (percent): P, 8.8; S, 9.1. Found (percent): P, 8.8; S, 9.2.

EXAMPLE 10

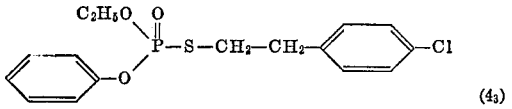
(4₃)

95 g. (0.4 mol) O-ethyl-O-phenyl-thionophosphoric acid ester chloride are dissolved in 300 ml. ethanol. 48 g. potassium hydroxide in 100 ml. of water are added to this solution at 20° C., with stirring. The temperature of the mixture rises to 70° C. The mixture is heated at this temperature for a further hour and 88 g. β-(4-chloro-phenyl)-ethyl bromide are then added to it, with further stirring. The reaction mixture is subsequently heated to 70 to 80° C. for a further 2 hours. The mixture is cooled to room temperature and taken up with 300 ml. methylene chloride. The methylene chloride solution is separated, washd with water, dried over sodium sulfate and, finally, the solvent is distilled off. When fractional distillation of the residue is effected, 48 g. (31% of the theory) of O-ethyl-O - phenyl - S - [β - (4 - chloro-phenyl)ethyl]-thiol-phosphoric acid ester are obtained in the form of a colorless, water-insoluble oil which boils at 140° C. at a pressure of 0.01 mm. Hg.

Calculated for C₁₆H₁₈ClO₃PS (molecular weight 356.5) (percent): P, 8.7; S, 9.0; Cl, 9.9. Found (percent): P, 9.0; S, 9.0; Cl, 9.3.

The median toxicity of the compound in the rat per os is 750 mg./kg.

EXAMPLE 11

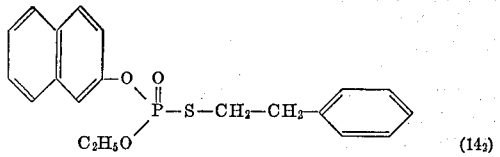
(14₂)

116 g. O-ethyl-O-(β-naphthyl)-thionophosphoric acid ester chloride [prepared from O-ethyl-thionophosphoric acid monoester dichloride and β-naphthol in the manner described in Example 9(a), B.P. 135° C./0.01 mm. Hg] are dissolved in a mixture of 200 ml. ethanol and 50 ml. of water, and to this solution there are added, with stirring, 50 g. potassium hydroxide dissolved in 50 ml. of water. The temperature of the mixture rises to 70° C. 74 g. β-phenyl-ethyl bromide are then added with further stirring, the temperature being kept at 70 to 80° C. for a further 2 hours. The reaction mixture is then cooled and 400 ml. benzene are added. The benzene solution obtained is separated, washed with water, dried over sodium sulfate and, finally, the solvent is distilled off. The residue is heated in a distillation apparatus at 70° C. for 20 minutes at a pressure of 0.01 mm. Hg.

88 g. (59% of the theory) of O-ethyl-O-(β-naphthyl)-S-(β'-phenyl-ethyl)-thiolphosphoric acid ester are obtained as colorless, water-insoluble oil.

Calculated for C₂₀H₂₁O₃PS (molecular weight 372) (percent): P, 8.3; S, 8.6. Found (percent): P, 8.0; S, 8.5.

EXAMPLE 12

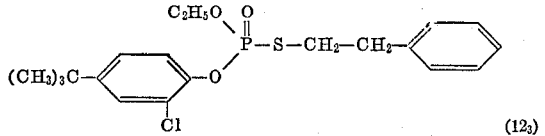
(12₃)

60 g. potassium hydroxide dissolved in 180 ml. of water are added, with stirring, to a solution of 163 g. O-ethyl-O - (2-chloro-4-tert.-butyl-phenyl)-thionophosphoric acid ester chloride [prepared by reaction of O-ethyl-thionophosphoric acid monoester dichloride with 2-chloro-4-tert.-butyl-phenol in the manner described in Example 9(a)] in 150 ml. ethanol. The temperature of the reaction mixture rises to 70° C. The mixture is heated at 75° C. for a further hour and 93 g. β-phenyl-ethyl bromide are then added, with further stirring. The temperature of the mixture is kept at 80° C. for a further 2 hours. The mixture is then allowed to cool and taken up in 400 ml. benzene. The benzene solution is washed with water, separated, and dried over sodium sulfate. After the benzene has been distilled off, the residue is heated at a bath temperature of 100° C. for 20 minutes at a pressure of 0.01 mm. Hg.

90 g. (44% of the theory) of O-ethyl-O-(2-chloro-4-tert.-butyl-phenyl)-S-(β - phenyl-ethyl)-thiolphosphoric acid ester are obtained as a water-insoluble, pale yellow oil.

Calculated for C₂₀H₂₆ClO₃PS (molecular weight 412.5) (percent): P, 7.5; S, 7.8; Cl, 8.6. Found (percent): P, 7.4; S, 7.9; Cl, 8.9.

EXAMPLE 13

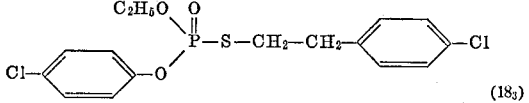
(18₃)

135 g. (0.5 mol) O-ethyl-O-(4-chloro-phenyl)-thionophosphoric acid ester chloride are dissolved in a mixture

EXAMPLE 8

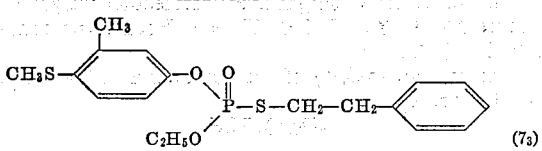
(7₃)

38 g. potassium hydroxide dissolved in 60 g. of water are added, with cooling, to a solution of 89 g. (0.3 mol) of O-ethyl-O-(3-methyl-4-methyl-mercapto-phenyl)-thionophosphoric acid ester chloride in 150 ml. ethanol and 40 ml. of water. 55 g. β-phenethyl bromide are then added dropwise to the reaction mixture at 70–80° C. Thereafter the mixture is stirred for 2 hours at 80° C., then poured into ice water, taken up with benzene and the benzene phase is dried and distilled. 75 g. (66% of the theory) of O-ethyl-O-(3-methyl-4-methylmercapto-phenyl)-S-(β-phenyl-ethyl)-thiolphosphoric acid ester of boiling point 120° C./0.01 mm. Hg. are obtained.

Calculated for $C_{18}H_{23}O_3PS_2$ (molecular weight 382) (percent): P, 8.1; S, 16.7. Found (percent): P, 7.9; S, 17.2.

EXAMPLE 9

(a)
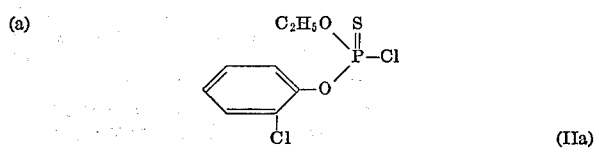
(IIa)

193 g. 2-chlorophenol dissolved in 250 cc. of water and 66 g. sodium hydroxide are added, at 20° C., to 269 g. (1.5 mols) O-ethyl-thionophosphoric acid monoester dichloride. After three hours' stirring, the reaction mixture is taken up in ether, the ethereal solution is washed until there is a neutral reaction, then dried, and the solvent is evaporated and the residue is distilled.

The yield of O-ethyl-O-(2-chloro-phenyl)-thionophosphoric acid ester chloride is 245 g. (60% of the theory), with a boiling point of 90° C./0.01 mm. Hg.

Calculated for $C_8H_9Cl_2O_2PS$ (molecular weight 271) (percent): P, 11.4; S, 11.8; Cl, 26.2. Found (percent): P, 11.5; S, 11.8; Cl, 25.9.

(b)
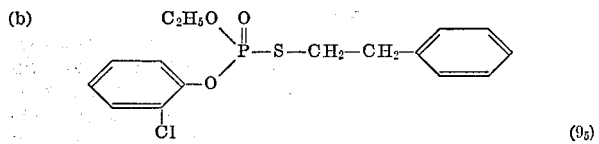
(9₅)

48 g. potassium hydroxide in 100 g. water are added at 20 to 70° C. to a solution of 108 g. O-ethyl-O-(2-chloro-phenyl)-thionophosphoric acid ester chloride in 250 ml. ethanol and 50 ml. water. 74 g. β-phenethyl bromide are then added to the mixture and the latter is heated to 80° C. for 2 hours. Finally, the reaction mixture is taken up in benzene, the benzene solution is washed until there is a neutral reaction, the solvent is evaporated and the residue is slightly distilled.

The yield of O-ethyl-O-(2-chloro-phenyl)-S-(β-phenyl-ethyl)-thiolphosphoric acid ester is 60 g. (42% of the theory).

Calculated for $C_{16}H_{18}ClO_3PS$ (molecular weight 356.5) (percent): P, 8.7; S, 9.0. Found (percent): P, 9.3; S, 9.4.

In analogous manner, the following compounds are obtained:

(a₁)
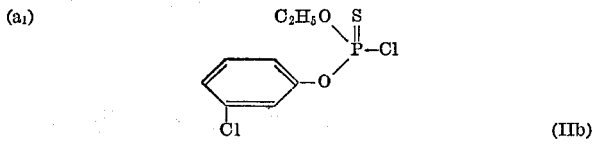
(IIb)

Yield: 63% of the theory of O-ethyl-O-(3-chloro-phenyl)-thionophosphoric acid ester chloride, B.P. 90° C./0.01 mm. Hg.

Calculated for $C_8H_9Cl_2O_2PS$ (molecular weight 271) (percent): P, 11.4; S, 11.8; Cl, 26.2. Found (percent): P, 11.5; S, 11.7; Cl, 26.2.

(b₁)
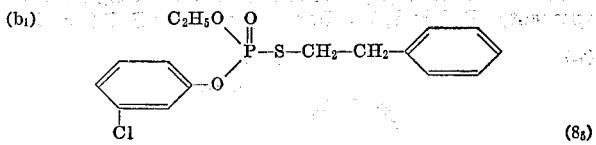
(8₅)

Yield: 24% of the theory of O-ethyl-O-(3-chloro-phenyl)-S-(β-phenyl-ethyl)-thiolphosphoric acid ester Calculated for $C_{16}H_{18}ClO_3PS$ (molecular weight 356.5) (percent): P, 8.7; S, 9.0. Found (percent): P, 9.1; S, 9.3.

(a₂)
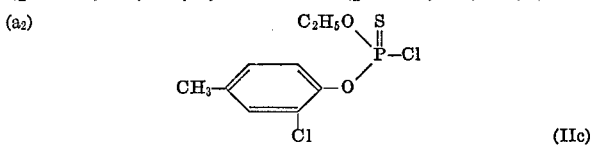
(IIc)

Yield: 71% of the theory of O-ethyl-O-(2-chloro-4-methylphenyl)-thionophosphoric acid ester chloride, B.P. 110° C./0.01 mm. Hg.

Calculated for $C_9H_{11}Cl_2O_2PS$ (molecular weight 285) (percent): P, 10.9; S, 11.2; Cl, 24.9. Found (percent): P, 10.9; S, 11.3; Cl, 25.2.

(b₂)
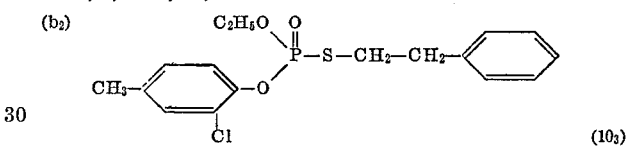
(10₃)

Yield: 54% of the theory of O-ethyl-O-(2-chloro-4-methylphenyl)-S-(β-phenyl-ethyl)-thiolphosphoric acid ester.

Calculated for $C_{17}H_{20}ClO_3PS$ (molecular weight 370.5) (percent): P, 8.4; S, 8.6. Found (percent): P, 9.1; S, 9.0.

(a₃)
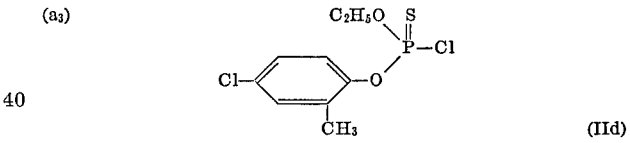
(IId)

Yield: 61% of the theory of O-ethyl-O-(2-methyl-4-chlorophenyl)-thionophosphoric acid ester chloride, B.P. 95° C./0.01 mm. Hg.

Calculated for $C_9H_{11}Cl_2O_2PS$ (molecular weight 285) (percent): P, 10.9; S, 11.2; Cl, 24.9. Found (percent): P, 10.7; S, 11.3; Cl, 24.9.

(b₃)
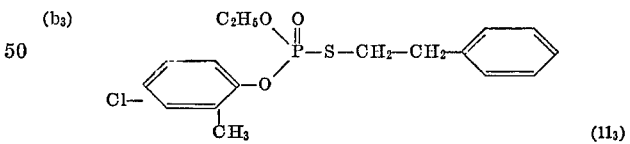
(11₃)

Yield: 48% of the theory of O-ethyl-O-(2-methyl-4-chlorophenyl)-S-(β-phenyl-ethyl)-thiolphosphoric acid ester.

Calculated for $C_{17}H_{20}ClO_3PS$ (molecular weight 370.5) (percent): P, 8.4; S, 8.6. Found (percent): P, 8.4; S, 8.8.

(a₄)
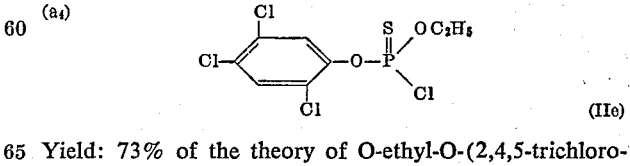
(IIe)

Yield: 73% of the theory of O-ethyl-O-(2,4,5-trichlorophenyl)-thionophosphoric acid ester chloride, B.P. 120° C./0.01 mm. Hg.

Calculated for $C_8H_7Cl_4O_2PS$ (molecular weight 340) (percent): P, 9.1; S, 9.4. Found (percent): P, 8.6; S, 8.9.

(b₄)
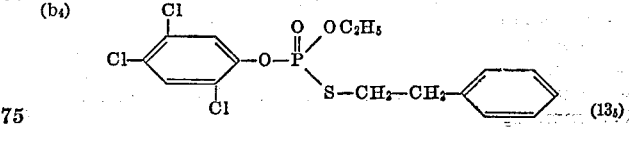
(13₃)

TABLE 6—Continued

| Active compound | Concentration of active compound in percent | Degree of destruction in percent |
|---|---|---|
| (17₃) 4-Cl-C₆H₄-O-P(=O)(OC₂H₅)-S-CH₂-CH₂-C₆H₄-Cl (2-Cl on first ring) | 0.2<br>0.02 | 100<br>90 |
| (16₄) 3-Cl-C₆H₄-O-P(=O)(OC₂H₅)-S-CH₂-CH₂-C₆H₄-Cl | 0.2<br>0.02 | 100<br>100 |
| (12₂) (CH₃)₃C-,Cl-C₆H₃-O-P(=O)(OC₂H₅)-S-CH₂-CH₂-C₆H₅ | 0.2<br>0.02 | 100<br>100 |
| (4₂) C₆H₅-O-P(=O)(OC₂H₅)-S-CH₂-CH₂-C₆H₄-Cl | 0.2<br>0.02 | 100<br>100 |
| (7₂) CH₃S-,CH₃-C₆H₃-O-P(=O)(OC₂H₅)-S-CH₂-CH₂-C₆H₅ | 0.2<br>0.02 | 100<br>100 |
| (9₄) 2-Cl-C₆H₄-O-P(=O)(OC₂H₅)-S-CH₂-CH₂-C₆H₅ | 0.1<br>0.01<br>0.001 | 100<br>100<br>60 |
| (19₃) CH₃S-C₆H₄-O-P(=O)(OC₂H₅)-S-CH₂-CH₂-C₆H₄-Cl | 0.2<br>0.02 | 100<br>100 |
| (6₂) CH₃O-C₆H₄-O-P(=O)(OC₂H₅)-S-CH₂-CH₂-C₆H₅ | 0.2<br>0.02 | 100<br>70 |

The following further examples are set forth to illustrate, without limitation, the process for producing the particular new compounds in accordance with the present invention.

EXAMPLE 7

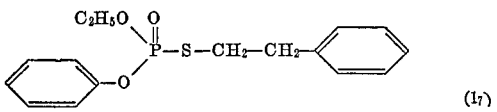

(1₇)

95 g. (0.4 mol) O-ethyl-O-phenyl-thionophosphoric acid ester chloride are dissolved in 200 ml. ethanol and 50 ml. water, and 48 g. potassium hydroxide in 100 ml. water are added to this solution. The mixture is then stirred for 1 hour until there is a neutral reaction, the solvent is evaporated and the residue is taken up in 200 ml. acetonitrile. 74 g. β-phenethyl bromide are added to this solution and it is then heated at 70 to 80° C. for 2 hours. After that, the reaction mixture is poured into water, taken up with benzene, the benzene phase is separated, washed and dried, the solvent is evaporated and the residue is slightly distilled.

The yield of O-ethyl-O-phenyl-S-(β-phenyl-ethyl)-thiolphosphoric acid ester is 96 g. (75% of the theory).

Calculated for C₁₆H₁₉O₃PS (molecular weight 322) (percent): S, 10.0; P, 9.7. Found (percent): S, 10.4; P, 10.3.

In analogous manner, the following compounds can be prepared:

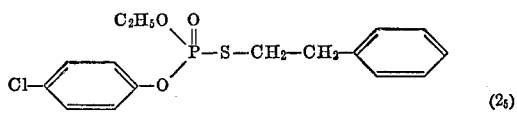

(2₆)

Yield: 80% of the theory of O-ethyl-O-(4-chloro-phenyl)-S-(β-phenyl-ethyl)-thiolphosphoric acid ester Calculated for C₁₆H₁₈ClO₃PS (molecular weight 357) (percent): S, 9.0; P, 8.7; Cl, 10.0. Found (percent) S, 8.9; P, 8.9; Cl, 10.6.

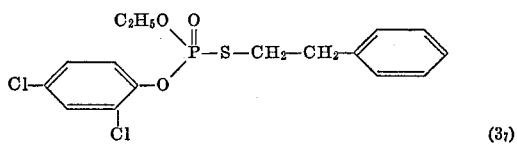

(3₇)

Yield: 80% of the theory of O-ethyl-O-(2,4-dichloro-phenyl)-S-(β-phenyl-ethyl)-thiolphosphoric acid ester Calculated for C₁₆H₁₇Cl₂O₃PS (molecular weight 391) (percent): S, 8.2; P, 7.9; Cl, 18.2. Found (percent): S, 7.8; P, 7.8; Cl, 18.6.

TABLE 5—Continued
[Mosquito larvae test]

| Active compound | | Concentration of active compound in the solution in p.p.m. | Degree of destruction in percent |
|---|---|---|---|
| (8₃) | 3-Cl-C₆H₄-O-P(=O)(OC₂H₅)-S-CH₂-CH₂-C₆H₅ | 0.1 | 100 |
| (9₃) | 2-Cl-C₆H₄-O-P(=O)(OC₂H₅)-S-CH₂-CH₂-C₆H₅ | 0.1 / 0.01 | 100 / 30 |
| (5₂) | 3-CH₃O-C₆H₄-O-P(=O)(OC₂H₅)-S-CH₂-CH₂-C₆H₅ | 1 / 0.1 | 100 / 90 |
| (3₅) | 2,4-Cl₂-C₆H₃-O-P(=O)(OC₂H₅)-S-CH₂CH₂-C₆H₅ | 0.1 | 100 |
| (1₅) | C₆H₅-O-P(=O)(OC₂H₅)-S-CH₂-CH₂-C₆H₅ | 1 / 0.1 | 100 / 30 |

EXAMPLE 6

LD₁₀₀ test

Test creatures: *Sitophilus granarius*
Solvent: Acetone 2 parts by weight of the particular active compound are dissolved in 1000 parts by volume of the stated solvent. The resulting solution is diluted with further solvent to the desired final concentration.

2.5 ml. of the given active compound solution are pipetted into a Petri dish on the bottom of which is situated a filter paper with a diameter of about 9.5 cm. The Petri dish remains uncovered until the solvent has completely evaporated. The amount of active compound per square metre of filter paper varies with the concentration of the solution of active compound used. About 25 test creatures are then placed in the Petri dish and the dish is covered with a glass lid.

The condition of the test creatures is observed after 1 and after 3 days from the commencement of the experiments. The knockdown effect is determined as a percentage.

The particular active compounds tested, their concentrations, the test creatures and the results obtained can be seen from the following Table 6:

TABLE 6
[LD₁₀₀ test]

| Active compound | | Concentration of active compound in percent | Degree of destruction in percent |
|---|---|---|---|
| (1₆) | C₆H₅-O-P(=O)(OC₂H₅)-S-CH₂-CH₂-C₆H₅ | 0.2 / 0.02 | 100 / 100 |
| (8₄) | 3-Cl-C₆H₄-O-P(=O)(OC₂H₅)-S-CH₂-CH₂-C₆H₅ | 0.2 / 0.02 | 100 / 100 |
| (3₆) | 2,4-Cl₂-C₆H₃-O-P(=O)(OC₂H₅)-S-CH₂-CH₂-C₆H₅ | 0.2 / 0.02 | 100 / 90 |
| (13₄) | 2,4,6-Cl₃-C₆H₂-O-P(=O)(OC₂H₅)-S-CH₂-CH₂-C₆H₅ | 0.2 / 0.02 | 100 / 100 |

TABLE 4—Continued

| Active compound | Concentration of active compound in percent | Degree of destruction in percent after 3 days |
|---|---|---|
| (18₁) Cl—⟨⟩—O\P(=O)(OC₂H₅)—S—CH₂—CH₂—⟨⟩—Cl | 0.1<br>0.01 | 100<br>100 |
| (19₁) CH₃S—⟨⟩—O\P(=O)(OC₂H₅)—S—CH₂—CH₂—⟨⟩—Cl | 0.1<br>0.01 | 100<br>95 |

EXAMPLE 5

Mosquito larvae test

Test creatures: *Aedes aegypti* (5th larval stage)
Solvent: 99 parts by weight acetone
Emulsifier: 1 part by weight benzylhydroxydiphenyl polyglycol ether To produce a suitable preparation of the particular active compound, 2 parts by weight of such active compound are dissolved in 1000 parts by volume of the solvent containing the amount of emulsifier stated above. The solution thus obtained is diluted with water to the desired lower concentrations.

The aqueous preparations of the given active compounds are placed in glass vessels and about 25 mosquito larvae are then placed in each glass vessel.

After 24 hours, the degree of destruction is determined as a percentage. 100% means that all the larvae are killed, whereas 0% means that no larvae at all are killed.

The particular active compounds tested, their concentrations, the test creatures and the results obtained can be seen from the following Table 5:

TABLE 5
[Mosquito larvae test]

| Active compound | Concentration of active compound in the solution in p.p.m. | Degree of destruction in percent |
|---|---|---|
| (18₂) Cl—⟨⟩—O\P(=O)(OC₂H₅)—S—CH₂—CH₂—⟨⟩—Cl | 1<br>0.1 | 100<br>60 |
| (16₃) Cl-⟨⟩—O\P(=O)(OC₂H₅)—S—CH₂—CH₂—⟨⟩—Cl | 1<br>0.1 | 100<br>90 |
| (17₂) Cl-⟨⟩—O\P(=O)(OC₂H₅)—S—CH₂—CH₂—⟨⟩—Cl | 1<br>0.1 | 100<br>60 |
| (19₂) CH₃S—⟨⟩—O\P(=O)(OC₂H₅)—S—CH₂—CH₂—⟨⟩—Cl | 1<br>0.1 | 100<br>70 |
| (11₂) Cl—⟨⟩(CH₃)—O\P(=O)(OC₂H₅)—S—CH₂—CH₂—⟨⟩ | 1<br>0.01 | 100<br>50 |
| (10₂) CH₃—⟨⟩(Cl)—O\P(=O)(OC₂H₅)—S—CH₂—CH₂—⟨⟩ | 0.1 | 100 |
| (13₂) Cl—⟨⟩(Cl)—O\P(=O)(OC₂H₅)—S—CH₂—CH₂—⟨⟩ | 0.1 | 100 |

TABLE 3
[Tick test]

| Active compound | Parasite | Concentration of active compound in the solution in percent | Inhibition of depositing of eggs in percent |
|---|---|---|---|
| ($1_3$) C₆H₅—O—P(=O)(OC₂H₅)—S—CH₂—CH₂—C₆H₅ | Boophilus microplus sensitive. | 1.0<br>0.1<br>0.01<br>0.001<br>0.0001<br>0.00001 | 100<br>100<br>100<br>100<br>100<br>0 |
| ($1_4$) C₆H₅—O—P(=O)(OC₂H₅)—S—CH₂—CH₂—C₆H₅ | Boophilus microplus resistant. | 1.0<br>0.1<br>0.01<br>0.001<br>0.0001 | 100<br>100<br>100<br><50<br>0 |
| ($2_3$) Cl—C₆H₄—O—P(=O)(OC₂H₅)—S—CH₂—CH₂—C₆H₅ | Boophilus microplus sensitive. | 1.0<br>0.1<br>0.01<br>0.001<br>0.0001<br>0.00001 | 100<br>100<br>100<br>100<br>100<br><50 |
| ($2_4$) Cl—C₆H₄—O—P(=O)(OC₂H₅)—S—CH₂—CH₂—C₆H₅ | Boophilus microplus resistant. | 1.0<br>0.1<br>0.01<br>0.001<br>0.0001 | 100<br>100<br>100<br>>50<br>0 |
| ($3_3$) Cl,Cl—C₆H₃—O—P(=O)(OC₂H₅)—S—CH₂—CH₂—C₆H₅ | Boophilus microplus sensitive. | 1.0<br>0.1<br>0.01<br>0.001<br>0.0001<br>0.00001 | 100<br>100<br>100<br>100<br>100<br><50 |
| ($3_4$) Cl,Cl—C₆H₃—O—P(=O)(OC₂H₅)—S—CH₂—CH₂—C₆H₅ | Boophilus microplus resistant. | 1.0<br>0.1<br>0.01<br>0.001 | 100<br>100<br>100<br>0 |

EXAMPLE 4

Plutella test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Cabbage leaves (*Brassica oleracea*) are sprayed with the given active compound preparation until dew moist and are then infested with caterpillars of the diamond-back moth (*Plutella maculipennis*).

After the specified period of time, the degree of destruction is detremined as a percentage: 100% means that all the caterpillars are killed whereas 0% means that none of the caterpillars are killed.

The particular active compounds tested, their concentrations, the evaluation time and the results obtained can be seen from the following Table 4:

TABLE 4
[Plutella test]

| Active compound | Concentration of active compound in percent | Degree of destruction in percent after 3 days |
|---|---|---|
| (B) (C₂H₅O)₂P(=O)—C—CH₂—CH₂—C₆H₅ (known) | 0.1<br>0.01 | 100<br>0 |
| ($15_2$) CH₃S—C₆H₄—O—P(=O)(OC₂H₅)—S—CH₂—CH₂—C₆H₅ | 0.1<br>0.01<br>0.001 | 100<br>100<br>80 |
| ($17_1$) Cl,Cl—C₆H₃—O—P(=O)(OC₂H₅)—S—CH₂—CH₂—C₆H₄—Cl | 0.1<br>0.01 | 100<br>100 |
| ($16_2$) Cl—C₆H₄—O—P(=O)(OC₂H₅)—S—CH₂—CH₂—C₆H₄—Cl | 0.1<br>0.01<br>0.001 | 100<br>100<br>80 | ing the dead mites. The degree of destruction thus obtained is expressed as a percentage: 100% means that all the spider mites are killed whereas 0% means that none of the spider mites are killed.

The particular active compounds tested, their concentrations, the evaluation time and the results obtained can be seen from the following Table 2:

Adult, gorged, female ticks of the species *Boophilus microplus* (sensitive and resistant, respectively) are immersed for one minute in the given active compound preparations. After immersion of, in each case, 10 female specimens of the different types of ticks, the latter are transferred to Petri dishes, the bottom of each of which is

TABLE 2
[Tetranychus test]

| Active compound | | Concentration of active compound in percent | Degree of destruction in percent after 48 hours |
|---|---|---|---|
| (A) | 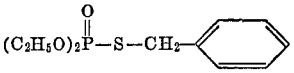 (known) | 0.1 | 0 |
| ($1_2$) | 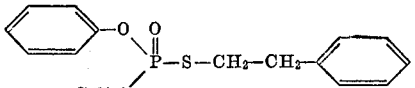 | 0.1 | 100 |
| ($2_2$) | 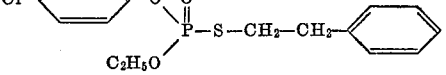 | 0.1 | 100 |
| ($3_2$) | 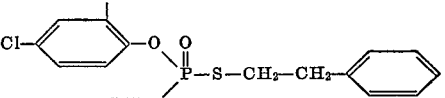 | 0.1 | 100 |
| ($8_2$) | 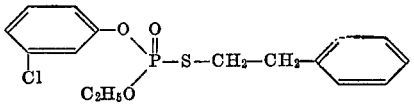 | 0.1<br>0.01 | 100<br>60 |
| ($9_2$) | 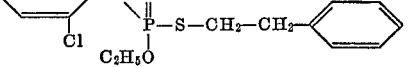 | 0.1<br>0.01 | 100<br>75 |
| ($13_2$) | 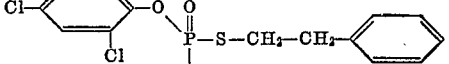 | 0.1<br>0.01 | 98<br>50 |
| ($15_1$) | 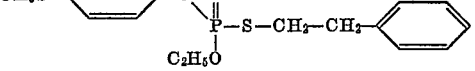 | 0.1 | 99 |
| ($16_1$) | 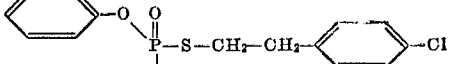 | 0.1 | 98 |

EXAMPLE 3

Tick test

Solvent: 35 parts by weight ethylglycol monomethyl ether
Emulsifier: 35 parts by weight nonylphenol polyglycol ether To produce a suitable preparation of the particular active compound, three parts by weight of such active compound are mixed with seven parts of a mixture of the stated amounts of solvent and emulsifier, and the resulting emulsion concentrate is diluted with water to the desired final concentration.

covered with a correspondingly large disc of filter paper.

After 10 days the effectiveness of the preparation of the given active compound is determined by ascertaining the inhibition of the depositing of eggs in comparison with untreated control ticks. The effect is expressed as a percentage, 100% meaning that no eggs are deposited, and 0% signifying that the tick deposited eggs in normal amount.

The particular active compounds tested, their concentrations, the test parasites and the results obtained can be seen from the following Table 3:

TABLE 1—Continued
[Phaedon-larvae test]

| Active compound | Concentration of active compound in percent | Degree of destruction in percent after 3 days |
|---|---|---|
| (4₁) Phenyl-O,O-ethyl-P(=O)-S-CH₂-CH₂-C₆H₄-Cl | 0.1 / 0.01 / 0.001 | 100 / 100 / 90 |
| (5₁) 4-CH₃O-C₆H₄-O,O-ethyl-P(=O)-S-CH₂-CH₂-C₆H₅ | 0.1 / 0.01 | 100 / 100 |
| (6₁) 2-OCH₃-C₆H₄-O,O-ethyl-P(=O)-S-CH₂-CH₂-C₆H₅ | 0.1 / 0.01 | 100 / 100 |
| (7₁) 3-CH₃S, 4-CH₃-C₆H₃-O,O-ethyl-P(=O)-S-CH₂-CH₂-C₆H₅ | 0.1 / 0.01 | 100 / 100 |
| (8₁) 2-Cl-C₆H₄-O,O-ethyl-P(=O)-S-CH₂-CH₂-C₆H₅ | 0.1 / 0.01 | 100 / 100 |
| (9₁) 4-Cl-C₆H₄-O,O-ethyl-P(=O)-S-CH₂-CH₂-C₆H₅ | 0.1 / 0.01 / 0.001 | 100 / 100 / 60 |
| (10₁) 4-CH₃, 3-Cl-C₆H₃-O,O-ethyl-P(=O)-S-CH₂-CH₂-C₆H₅ | 0.1 / 0.01 | 100 / 100 |
| (11₁) 4-Cl, 2-CH₃-C₆H₃-O,O-ethyl-P(=O)-S-CH₂-CH₂-C₆H₅ | 0.1 / 0.01 | 100 / 100 |
| (12₁) 4-(CH₃)₃C, 2-Cl-C₆H₃-O,O-ethyl-P(=O)-S-CH₂-CH₂-C₆H₅ | 0.1 / 0.01 | 100 / 95 |
| (13₁) 2,4,5-Cl₃-C₆H₂-O,O-ethyl-P(=O)-S-CH₂-CH₂-C₆H₅ | 0.1 / 0.01 | 100 / 100 |
| (14₁) 1-naphthyl-O,O-ethyl-P(=O)-S-CH₂-CH₂-C₆H₅ | 0.1 / 0.01 | 100 / 100 |

EXAMPLE 2

Tetranychus test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the active compound preparation is determined by countsolid and/or liquid dispersible carrier vehicles and/or with other known compatible active agents, especially plant protection agents, suchas other acaricides or insecticides, or fungicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.00001–20%, preferably 0.01–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001–95%, and preferably 0.01–95%, by weight of the mixture.

The active compounds can also be used in accordance with the well known ultra-low-volume process with good success, i.e., by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention contemplates methods of selectively killing, combating or controlling pests, e.g. arthropods, i.e. insects and acarids, and more particularly, methods of combating at least one of insects and acarids which comprise applying to at least one of correspondingly (a) such insects, (b) such acarids, and (c) the corresponding habitat, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention is illustrated without limitation by the following examples:

EXAMPLE 1

Phaedon larvae test

Solvent: 3 parts by weight acetone
Emulsifier: 1 part by weight alkylaryl polyglycol ether To produce a suitable preparation of the particular active compound, 1 part by weight of such active compound is mixed with the stated amount of solvent contaninig the stated amount of emulsifier, and the resulting concentrate is diluted with water to the desired final concentration.

Cabbage leaves (*Brassica oleracea*) are sprayed with this preparation of the given active compound until dripping wet and then infested with mustard beetle larvae (*Phaedon cochleariae*).

After the period of time stated in the following table, the degree of destruction of the pests is determined and expressed as a percentage: 100 means that all, and 0 means that none, of the beetle larvae are killed.

The particular active compounds tested, their concentrations, the evaluation time and the experimental results obtained can be seen from the following Table 1:

TABLE 1
[Phaedon-larvae test]

| Active compound | Concentration of active compound in percent | Degree of destruction in percent after 3 days |
|---|---|---|
| (A) 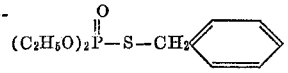 (Known) | 0.1 | |
| (1₁) 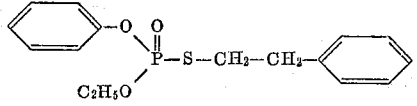 | 0.1<br>0.01<br>0.001 | 100<br>100<br>90 |
| (2₁) 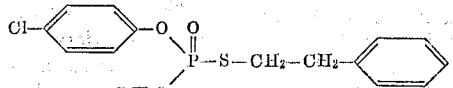 | 0.1<br>0.01<br>0.001 | 100<br>100<br>80 |
| (3₁) 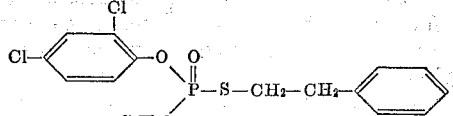 | 0.1<br>0.01 | 100<br>100 |

The instant O-alkyl-O-aryl-thiophosphoric acid esters are obtained in most cases in the form of colorless to slightly colored water-insoluble oils, some of which can be distilled under greatly reduced pressure without decomposition. When this is not possible, the instant compounds can, however, by so-called "slight distillation," that is brief heating to moderately elevated temperatures in a vacuum, be freed from the last volatile components and so be purified.

As already mentioned, the compounds according to the present invention are distinguished by an outstanding insecticidal and acaricidal effectiveness and some of them also possess a good fungitoxic activity. The instant compounds have a low toxicity towards warm blooded animals and a concomitantly low phytotoxicity. The pesticidal effect sets in rapidly and is long-lasting. By reason of these properties, the instant compounds can be used for plant protection and the protection of stored products and in the hygiene field for the control of noxious sucking and eating insects and of mites and phytopathogenic fungi.

The main sucking insects contemplated herein include: aphids (Aphidae) such as the green peach aphid (*Myrus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the current gall aphid (*Cryptomyzus korschelti*), the mealy apple aphid (*Sappaphis mali*), the mealy plum aphid (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and also cicadas, such as *Euscelis bilobatus* and *Nephotettix bipunctatus*; and the like.

In the case of the biting insects contemplated herein, above all there may be mentioned: butterfly caterpillars (Lepidoptera) such as the diamond-back moth (*Plutella maculipennis*), the gipsy moth (*Lymantria dispar*), the browntail moth (*Euproctis chrysorrhoea*) and tent caterpillar (*Malascosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*); and the like.

Also to be classed with the biting insects contemplated herein are beetles (*Coleoptera*) for example the granary weevil (*Sitophilus granarius-Calandra granaria*), the Colorado beetle (*Leptinotarsa decemlineata*), the dock beetle (*Gastrophysa viridula*), the mustard beetle (*Phaedon cochleariae*), the blossom beetle (*Meligethes aeneus*), the raspberry beetle (*Byturus tomentosus*), the bean weevil (Bruchidius-*Acanthoscelides obtectus*), the leather beetle (*Dermestes frischi*), khapra beetle (*Trogoderma granorium*), the flour beetle (*Tribolium castaneum*), the northern corn billbug (Calandra or *Sitophilus zeamais*), the drugstore beetle (*Stegobium paniceum*), the yellow mealworm (*Tenebrio molitor*) and the saw-toothed grain beetle (*Oryzaephilus surinamensis*) and also species living in the soil, for example wireworms (Agritotes spec.) and larvae of the cockchafer (*Melolontha melolontha*); cockroaches, such as the German cockroach (*Blattella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further, Orthoptera, for example the house cricket (*Acheta domestica*); termites such as the eastern subterranean termite (*Reticulitermes flavipes*) and Hymenoptera such as ants, for example the garden ant (*Lasius niger*); and the like.

The Diptera contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the blackbow fly (*Phormia aegina*) and blue-bottle fly (*Calliphora erythorcephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) contemplated herein there are classed, in particular, the spider mites (Tetranychidae) such as the two-spotted spider mite (*Tetranychus telarius-Tetranychus althaeae* or *Tetranychus urticae*) and the European red mite (*Paratetranychus pilosus-Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

When used against hygiene pests and pests of stored products, particularly flies and mosquitoes, the instant compounds are also distinguished by an outstanding residual activity on wood and clay and a good stability to alkali on limed substrates.

The active compounds according to the instant invention can be utilized, if desired, in the form of the usual formulations or compositions with conventional inert pesticidal diluents or extenders, i.e. conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, espectially chlorinated, aromatic hydrocarbons (e.g. chlorobenzenes, etc.), paraffins (e.g. petroleum fractions), chlorinated aliphatic hydrocarbons (e.g. methylene chloride, etc.) alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such

Disclaimer 3,641,221.—*Gerhard Schrader*, Wuppertal-Cronenberg, *Ingeborg Hammann*, Cologne, and *Wilhelm Stendel*, Wuppertal-Vohwinkel, Germany. O-ALKYL-O-ARYL-THIOLPHOSPHORIC ACID ESTERS. Patent dated Feb. 8, 1972. Disclaimer filed May 26, 1976, by the assignee, *Bayer Aktiengesellschaft*.

Hereby enters this disclaimer to claims 1, 3 and 4 of said patent.

[*Official Gazette August 10, 1976.*]